(12) United States Patent
Cardenas-Valencia et al.

(10) Patent No.: US 7,931,978 B1
(45) Date of Patent: Apr. 26, 2011

(54) ELECTROCHEMICAL POWER SOURCE USING HALOGENATED ORGANIC COMPOUNDS

(75) Inventors: Andres M. Cardenas-Valencia, Tampa, FL (US); Carl J. Biver, Clearwater, FL (US); Lawrence C. Langebrake, Seminole, FL (US); John Bumgarner, Clearwater, FL (US)

(73) Assignee: University of South Florida, Tampa, FL (US)

( * ) Notice: Subject to any disclaimer, the term of this patent is extended or adjusted under 35 U.S.C. 154(b) by 326 days.

(21) Appl. No.: 11/746,326

(22) Filed: May 9, 2007

Related U.S. Application Data

(60) Provisional application No. 60/746,816, filed on May 9, 2006.

(51) Int. Cl.
*H01M 6/04* (2006.01)
*H01M 6/32* (2006.01)

(52) U.S. Cl. ......... 429/52; 429/109; 429/118; 429/199; 429/200; 429/347

(58) Field of Classification Search .................. 429/105, 429/106, 107, 108, 109, 199, 52, 118, 200, 429/347
See application file for complete search history.

(56) References Cited

U.S. PATENT DOCUMENTS

| | | | | |
|---|---|---|---|---|
| 4,007,054 A | * | 2/1977 | Marincic et al. | 429/206 |
| 4,011,373 A | * | 3/1977 | Kaun et al. | 429/221 |
| 4,160,069 A | * | 7/1979 | Johnson et al. | 429/104 |
| 4,397,922 A | * | 8/1983 | Pokhodenko et al. | 429/105 |
| 5,718,986 A | | 2/1998 | Brenner | |
| 6,159,533 A | * | 12/2000 | Dearnaley et al. | 427/115 |
| 6,465,124 B1 | | 10/2002 | Medeiros et al. | |
| 6,527,955 B1 | * | 3/2003 | Sun | 429/249 X |

OTHER PUBLICATIONS

Karpinski, P., S. J. Russell, J. R. Serenyi, and J. P. Murphy. Silver Based Batteries for High Power Applications. J. Power Sources, 91(2000) 77.
Licht, S. A Novel Aqueous Aluminum/Permanganate Fuel Cell. Electrochem. Commun, 1,33, 1999.
Licht, S., and C. Marsh. A Novel Aqueous Aluminum/Ferricyanide Battery. . J. Electrochem. Soc. 139 (1992) L109.
Peramunage, D., and S. Licht. A Solid Sulfur Cathode for Aqueous Batteries. Science 261(1993) 1029.
Licht,S., and D. Peramunage. Novel Aqueous Aluminum/Sulfur Batteries. J. Electrochem. Soc. 140 (1993)L4.
Licht,S, and N. Myung. A High Energy and Power Novel Aluminum/Nickel BatteryJ. Electrochem. Soc. 142 (1995) L179.
Zaromb,S. The Use and Behavior of Aluminum Anodes in Alkaline Primary Batteries. J. Electrochem. Soc. 109. (1962) 1125.
Trevethan, L., D. Bockstie, and S. Zaromb, Control of Al Corrosion in Caustic Solutions. J. Electrochem. Soc, 110 (1963) 267.
Licht, S. Novel aluminum batteries: A Step Towards Derivation of Superbatteries. Col. Surf. A. 134. I, (1998), 241-248.

(Continued)

*Primary Examiner* — Stephen J. Kalafut
(74) *Attorney, Agent, or Firm* — Jeremy Spier; Smith & Hopen, P.A.

(57) ABSTRACT

Halogenated organic compounds that are inexpensive and are readily available have been used to present the examples of the invention. These chemicals, when in contact with water experience a reaction that releases oxy-halogenated acid. These compounds are weak acids and release hydrogen ions according to their ionization constant keeping a constant level of oxy-halogenated ion. These ions are capable of reacting with catalytic cathodes and can be coupled with anode materials to fabricate galvanic cells. Exemplary embodiments of the present invention include cells with flat and cylindrical form factors having a variety of anodes.

17 Claims, 21 Drawing Sheets

Figure 1. Flat form factor fabricated batteries. 1A. Fabricated with a plate anode material.
1B. Fabricated with a wire functioning as an anode.

OTHER PUBLICATIONS

Li, Q. and N. J. Bjerrum. Al as Anode for Energy Storage and Conversion. J. Power Sources, 110, (2002), 1-10.

Medeiros, Maria G., Dow, Eric G. Magnesium-solution phase catholyte seawater electrochemical System. Journal of Power Sources vol. 80 n 1 1999. p. 78-82.

Cardenas-Valencia, A. M, J. J. Dlutowski, J. Bumgarner, S. Knighton, C. Biver and L. Langebrake. "Aluminum-Anode, Silicon-based Micro-cells for Powering Expendable MEMS & Lab-on-a-Chip Devices". Submitted to Sensors and Actuators: Chem. B, (Jul. 2006).

Cardenas-Valencia, A. M., V. R Challa, D. Fries, L. Langebrake, R. F. Benson and S. Bhansali. A Microfluidic Galvanic Cell as an on-chip power source. Sensors and Actuators: Chem. B vol. 95(1-3), 2003, pp. 406-413.

Cardenas-Valencia, A. M., D. Fries, H. Broadbent, L. Langebrake, and R. F. Benson. "Microactuated Aluminum Galvanic and Semi-Fuel Cells for Powering Remote Lab on a Chip Applications" Proc. Volume, iTAS 2003, the 7th International Conference on Miniaturized Chemical and BioChemical Analysis Systems, vol. 1 pp. 311-314.

Cardenas-Valencia, A. M., D. P. Fries, G. Steimle, H. Broadbent, L. C. Langebrake and R. F. Benson. "Fabrication of Micro-Actuated Galvanic Cells as Power Sources for Lab on Chip Applications By Means of Novel PCB/MEMS technology". Fuel Cell Science, Engineering and Technology 2003 p. 279-286 First International Conference on Fuel Cells, NY, USA.

Udhayan, R. and D. P. Bhatt. Evaluation of Open Circuit Voltage and Corrosion Rate in Magnesium/N-Halogen Organic Cells J. Electrochem. Soc. 140, L58 (1993).

Bhatt, D. P. , S. Karthikeyan, and R. Udhayan, A New Magnesium/Organic Primary Cell J. Electrochem. Soc. 139, 3019 (1992).

Pollack, M. J. Corporate author Honeywell Inc Horsham PA Power Sources Center. Low Cost Water Activated Reserve Battery, ADA008053, DTIC, Feb. 1974.

* cited by examiner

Fig. 1 Prior Art

| Oxidation reaction | Standard Potential, $E^0$, Volts | Oxidation reaction | Standard Potential, $E^0$, Volts |
|---|---|---|---|
| $Li \rightarrow Li^{+1} + 1e^-$ | 3.03 | $Fe \rightarrow Fe^{+2} + 2e^-$ | 0.44 |
| $Mg \rightarrow Mg^{+2} + 2e^-$ | 2.37 | $In \rightarrow In^{+3} + 3e^-$ | 0.34 |
| $Al \rightarrow Al^{+3} + 3e^-$ | 1.66 | $Sn \rightarrow Sn^{+2} + 2e^-$ | 0.14 |
| $Zn \rightarrow Zn^{+2} + 2e^-$ | 0.76 | $Pb \rightarrow Pb^{+2} + 2e^-$ | 0.13 |

Fig. 2 Prior Art

| Material/ Atomic weight g/mol | Density g/cc | Electrochemical Equivalents & Energetic content | | Material/ Atomic weight g/mol | Density g/cc | Electrochemical Equivalents& Energetic content | | |
|---|---|---|---|---|---|---|---|---|
| | | Current Ah/g | Energy Wh/g | Energy Wh/cc | | | Current Ah/g | Energy Wh/g | Energy Wh/cc |

| Material/ Atomic weight g/mol | Density g/cc | Current Ah/g | Energy Wh/g | Energy Wh/cc | Material/ Atomic weight g/mol | Density g/cc | Current Ah/g | Energy Wh/g | Energy Wh/cc |
|---|---|---|---|---|---|---|---|---|---|
| Li/ 6.94 | 0.54 | 3.86 | 11.7 | 6.32 | Fe/ 55.8 | 7.85 | 0.96 | 0.42 | 3.31 |
| Mg/24.3 | 1.74 | 2.20 | 5.23 | 9.10 | In/114.8 | 7.31 | 0.70 | 0.24 | 1.74 |
| Al/26.9 | 2.69 | 2.98 | 4.96 | 13.35 | Sn/ 118.7 | 7.30 | 0.45 | 0.063 | 0.46 |
| Zn/65.4 | 7.14 | 0.82 | 0.62 | 4.45 | Pb/ 207.2 | 11.34 | 0.26 | 0.033 | 0.38 |

Fig. 3 Prior Art

| Reduction half reaction and standard potential | | Comments |
|---|---|---|
| $2NH_4^+ + 2\bar{e} \rightarrow 2NH_3 + H_2$ | $E^o = 0.80V$ | Lecancle cells (patented in 1866) use this reaction |
| $Cu_{(aq)}^{+2} + 2\bar{e} \rightarrow Cu^0$ | $E^o = 0.17V$ | This reaction is used with a saline bridge and a Zinc anode. (Danielle's cell). |
| $2MnO_{2(s)} + H_2O_{(l)} + 2\bar{e} \rightarrow 2MnO(OH)_{(s)} + 2OH^-_{(aq)}$ | $E^o = -0.05V$ | This reaction is used in alkaline dry cells |
| $2Ag_2O_2 + H_2O + 2\bar{e} \rightarrow 2AgO + OH^-_{(aq)}$ | $E^o = 0.74V$ | This reaction that has been couple with zinc and cadmium to develop secondary batteries. Also used with Aluminum |
| $O_{2(g)} + H_2O + 4\bar{e} \rightarrow 4OH_{(aq)}^-$ | $E^o = 0.40V$ | Commercial Zinc-air cells have been developed using this reaction. Other metals, including aluminum have also been investigated as possible anodes. |
| $NiO_{2(s)} + 2H_2O + 2\bar{e} \rightarrow Ni(OH)_{2(s)} + 2OH^-_{(aq)}$ | $E^o = 0.V$ | This half reaction is used with oxidation of cadmium in alkaline solution in commercial rechargeable nickel-cadmium batteries. |
| $PbO_2 + SO_4^{-2}{}_{(aq)} + 4H^+ + 2\bar{e} \rightarrow PbSO_{4(s)} + H_2O_{(l)}$ | $E^o = 1.69\ V$ | Reaction that is used in Lead-acid batteries (Secondary or storage batteries) |

Fig. 4 Prior Art

| Primary Batteries | | | | | | | | |
|---|---|---|---|---|---|---|---|---|
| Battery type | Anode | Cathode | Theoretical Values* | | | Practical Battery** | | |
| | | | Potential, Volts | Ah/Kg | Wh/Kg | Nominal Voltage | Wh/Kg | Wh/L |
| Leclanche | Zn | $MnO_2$ | 1.6 | 224 | 358 | 1.5 | 85[4] | 165[4] |
| Magnesium | Mg | $MnO_2$ | 2.8 | 271 | 759 | 1.7 | 100[4] | 195[4] |
| Alkaline $MnO_2$ | Zn | $MnO_2$ | 1.5 | 224 | 358 | 1.5 | 145[4] | 400[4] |
| Mercury | Zn | HgO | 1.34 | 190 | 255 | 1.35 | 100[6] | 470[6] |
| Silver Oxide | Zn | $Ag_2O$ | 1.6 | 180 | 288 | 1.6 | 135[6] | 525[6] |
| Zn/Air | Zn | Ambient air | 1.65 | 820 | 1353 | 1.5 | 370[6] | 1300[6] |
| $Li/I_2$ | Li | $I_2$(P2VP) | 2.8 | 200 | 560 | 2.8 | 245 | 900 |
| $Li/SOCl_2$ | Li | $SOCl_2$ | 3.65 | 403 | 1471 | 3.6 | 590[4] | 1100[4] |
| Reserve Batteries | | | | | | | | |
| Battery type | Anode | Cathode | Theoretical Values | | | Practical Battery | | |
| | | | Potential, Volts | Ah/Kg | Wh/Kg | Nominal Voltage | Wh/Kg | Wh/L |
| Cuprous Chloride | Mg | CuCl | 1.6 | 241 | 386 | 1.3 | 60[7] | 80[7] |
| Zinc/silver oxide | Zn | AgO | 1.81 | 283 | 512 | 1.5 | 30[8] | 75[8] |
| Thermal | Li | $FeS_2$ | 2.1-1.6 | 726 | 1307 | 2.1-1.6 | 40[9] | 100[9] |
| Secondary batteries | | | | | | | | |
| Battery type | Anode | Cathode | Theoretical Values | | | Practical Battery | | |
| | | | Potential, Volts | Ah/Kg | Wh/Kg | Nominal Voltage | Wh/Kg | Wh/L |
| Lead-acid | Pb | $PbO_2$ | 2.1 | 120 | 252 | 2.0 | 35 | 70[10] |
| Nickel-Cadmium | Cd | Ni oxide | 1.35 | 181 | 244 | 1.2 | 35 | 100[5] |
| Nickel-metal hydride | $MH^{(1)}$ | Ni oxide | 1.35 | 178 | 240 | 1.2 | 75 | 240[5] |
| Lithium-ion | $Li_xC_6$ | $Li_{(1-x)}CoO_2$ | 4.1 | 100 | 410 | 4.1 | 150 | 400[5] |
| Lithium/Manganese dioxide | Li | $MnO_2$ | 3.5 | 286 | 1001 | 3.0 | 120 | 265 |
| Fuel Cells | | | | | | | | |
| Battery type | Anode | Cathode | Theoretical Values | | | Practical Battery | | |
| | | | Potential, Volts | Ah/Kg | Wh/Kg | Nominal Voltage | Wh/Kg | Wh/L |
| $H_2/O_2$ | $H_2$ | $O_2$ | 1.23 | 2975 | 3660 | | | |
| $H_2$/air | $H_2$ | Ambient air | 1.23 | 26587 | 32702 | | | |
| Methanol/$O_2$ | $CH_3OH$ | $O_2$ | 1.24 | 2000 | 2480 | - | - | - |
| Methanol/Air | $CH_3OH$ | Ambient air | 1.24 | 5020 | 6225 | - | - | - |

*Based on active anode and cathode materials only, including $O_2$ but not air (electrolyte not included).
**Values are for single cell batteries based on identified design and at discharge rates optimized for energy density, using midpoint voltage.
(1) MH=metal hydride, data based on 1.7% hydrogen storage (by weight).
(4) Cylindrical bobbin-type batteries. (5) Cylindrical spiral-wound batteries. (6) Button type batteries.
(7) Water-activated. (8) Automatically activated 2- to 10-min rate. (9) With lithium anodes.
(10) Prismatic batteries

Fig. 5 Prior Art

| Battery type | Overall Equation | Theoretical Values | | |
|---|---|---|---|---|
| | | Potential Volts | Ah/ Kg | Wh/ Kg |
| Al-O$_2$ | 4Al$_{(s)}$+3O$_{2(g)}$+4 OH$^-_{(aq)}$+6H$_2$O$_{(l)}$→ 4 Al(OH)$^-_{4(aq)}$ | 2.8 | 935.6 | 2619.6 |
| Al-H$_2$O$_2$* | 2Al$_{(s)}$+3H$_2$O$_{2(l)}$+2OH$^-_{(aq)}$→2Al(OH)$_4^-$ | 3.2 | 363.9 | 1164.5 |
| Al-KMnO$_4$ | Al$_{(s)}$+KMnO$_{4(aq)}$+2H$_2$O→KAl(OH)$_{4(aq)}$+ MnO$_2$ | 2.9 | 363.8 | 1055.0 |
| Al-AgO | 2Al$_{(s)}$+3AgO+2OH$^-_{(aq)}$+3H$_2$O→2Al(OH)$^-_{4(aq)}$+ 3Ag | 2.7 | 304.6 | 822.5 |
| Al-K$_3$Fe(CN)$_6$ | Al$_{(s)}$+3Fe(CN)$^{-3}_6$+3OH$^-_{(aq)}$→3Fe(CN)$^{-4}_{6\,(aq)}$+ Al(OH)$_3$ | 2.8 | 74.0 | 207.3 |
| Al-Sulfur | 2Al$_{(s)}$+S$_4^{-2}$+2OH$^-_{(aq)}$+4H$_2$O→4HS$^-_{(aq)}$+ 2Al(OH)$_3$ | 1.8 | 532.6 | 958.8 |
| Al-NiOOH | Al$_{(s)}$+3NiOOH+OH$^-_{(aq)}$+3H$_2$O→Al(OH)$_4^-{}_{(aq)}$+ 3Ni(OH)$_2$ | 2.8 | 245.9 | 688.6 |
| Al-MnO2 | Al$_{(s)}$+3MnO$_2$+3H$_2$O→3MnOOH+ Al(OH)$_3$ | 2.4 | 279.2 | 670.0 | sweater is used as electrolyte
*30% solution of H$_2$O$_2$
** When OH$^-$ are involved n the reaction it was assumed that lithium hydroxide (with a small molecular mass) was the reagent that provide this ion

Fig. 6

| Material | Trichloro-s-triazinetrione. trichloro-isocianuric acid | Sodium dichloro-s-triazinetrione | 1-bromo-3-chloro-5,5-dimethylhydantoin | 1,3-dichloro-5,5-dimethylhydantoin |
|---|---|---|---|---|
| Chemical formula | | | | |
| Molecular weight | 232.41 | 255.97 | 241.37 | 196.91 |
| Material | 1,3-dichloro-5-ethyl-5-methylhydantoin | chloro-succiminide | Bromo-succiminide | Iodo-succiminide |
| Chemical formula | | | | |
| Molecular weight | 210.9 | 133.53 | 177.99 | 224.98 |

Equation 10.

Figure 1. Flat form factor fabricated batteries. 1A. Fabricated with a plate anode material. 1B. Fabricated with a wire functioning as an anode.

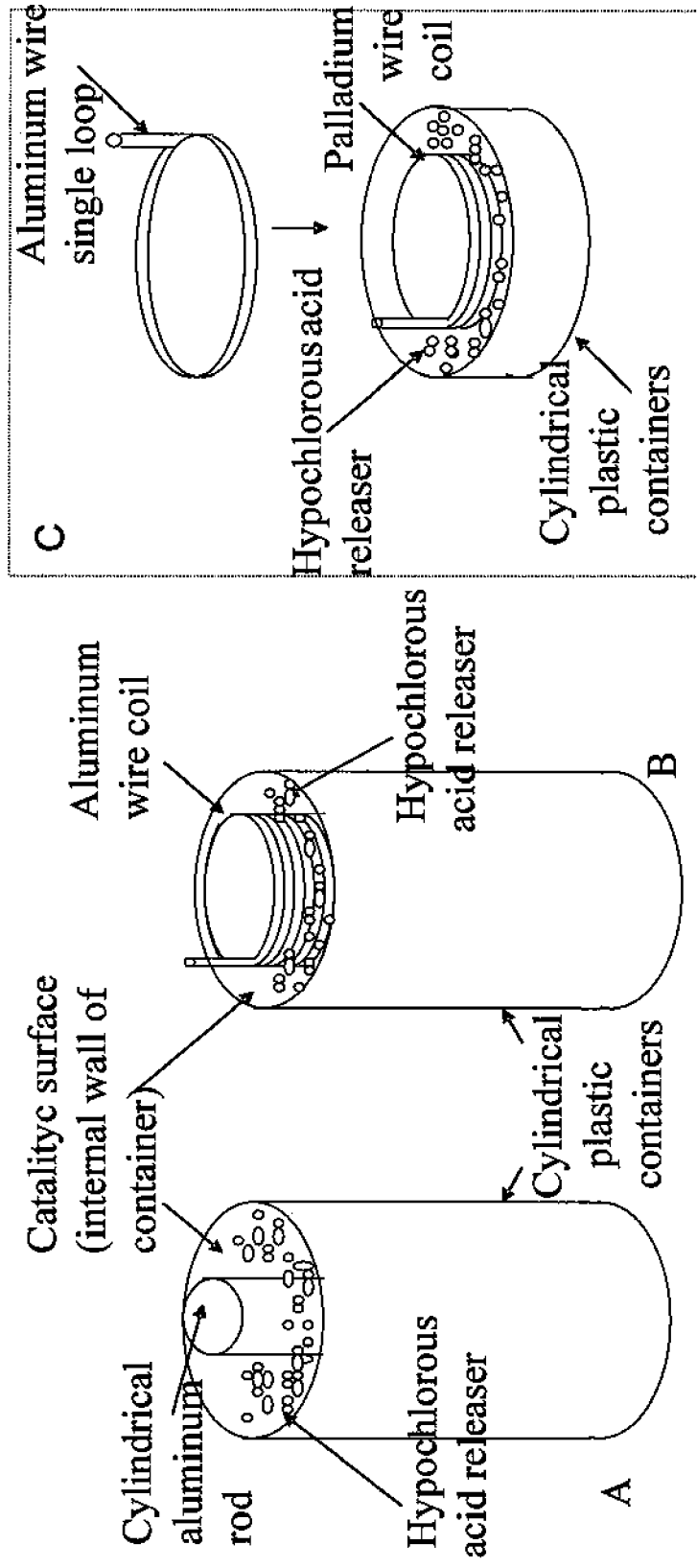
Figure 2. Cylindrical assembly of cells Bobin types A and B) and button size (C) using novel materials with two catalytic cathodes.

Fig. 10

| Case ID | Metal anode | Purity | Characteristics of anode material | Acquired from |
|---|---|---|---|---|
| 1 | Lithium | 99.9 | Sheet: 1.5 mm thick | Alfa-aesar |
| 2a | Aluminum | 96-99 | Foil: 0.1 mm thick | Alcoa (3003) |
| 2b | Aluminum | 99.998 | Sheet: 1.0 mm thick | Alfa aesar |
| 2c | Aluminum | 99.9999 | Foil: 0.25 mm diameter | Alfa aesar |
| 2d | Aluminum | 99.998 | Wire: 1.0 mm diameter | Alfa aesar |
| 2e | Aluminum | 99.999 | Cylindrical Rod: 9.5 mm diameter | Alfa aesar |
| 3 | Magnesium | 99.9 | Foil: 0.25 mm thick | Alfa aesar |
| 4 | Zinc | 99.98 | Zinc: 0.25 mm thick | Alfa aesar |
| 5 | Iron | 99.5 | Foil: 0.127 mm thick | Alfa aesar |
| 6 | Tin | 99.8 | Foil 0.25 mm thick | Alfa aesar |
| 7 | Indium | 99.999 | Wire: 1.0 mm diameter | Alfaaesar |
| 8 | Tin-Lead alloy | Tin 63 Lead 37 | Wire: 1.5 mm diameter | Kester Solder (Sauter material) |

Fig. 11

| Case ID. Chemical formula | Hypochlorous acid/hypochlorite ion releaser | Purity (%)* | Available (%) halogen* | Manufacturer(s) | Commercial available form |
|---|---|---|---|---|---|
| A** | Trichloro-s-triazinetrione Also known as trichloro isocianuric acid | 99.0 | Clorine 90 | Pool time Aqua chem. | 3" diameter tablets |
| B** | Sodium dichloro-s-triazinetrione | 99.0 | Chlorine 55 | Pool time | Powder |
| C** | 1-bromo-3-chloro-5,5-dimethylhydantoin | 96.0 | NA | Spa time | Powder |
| D** | Mixture of hydantoins**: 1-bromo-3-chloro-5,5-dimethylhydantoin 1,3-dichloro-5,5-dimethylhydantoin 1,3-dichloro-5-ethyl-5-dimethylhydantoin | 51.0 23.3 9.0 | Bromine 33.3 Chlorine 37.7 (in mixture) | Clorox | 2.5" tablets (for toilet bowl cleaner) |
| E*** | Chlorosuccinimide | 99 | Chlorine 32.4 | Alfa aesar | Powder form |
| F*** | Bromosuccinimide | 99 | Bromo 51.9 | Alfa aesar | Powder form |
| G*** | Iodo succiminide | 98+ | Iodo 63.2 | Alfa aesar | Powder form |

*As stated in the packaging of manufacturer.
** Commercially available as disinfectant product.
*** acquired from Alfa aesar, chemical supplier.

Fig. 13

| Case ID | Metal anode (Active area) | Potential | | | | Operational time ($t_{op}$), hours | Energy Delivered Joules | Charge delivered Coulombs |
| --- | --- | --- | --- | --- | --- | --- | --- | --- |
| | | Open circuit | Maximum Reached V, during $t_{op}$ | Voltage at time equal to $t_{op}$ | Average during $t_{op}$ | | | |
| 1 | Lithium (24 cm$^2$) | 4.11 | 2.99 | 0.79 | 2.13 | 0.65 | 230.4 | 96.4 |
| 2b | Aluminum (24 cm$^2$) | 1.90 | 1.26 | 1.18 | 1.21 | 6.13 | 632.6 | 524.69 |
| 3 | Magnesium (21 cm$^2$) | 2.71 | 1.90 | 0.30 | 1.13 | 6.75 | 638.4 | 484.3 |
| 4 | Zinc (24 cm$^2$) | 1.99 | 1.21 | 0.27 | 0.77 | 6.13 | 299.3 | 328.7 |
| 5 | Iron (12.5 cm$^2$) | 1.60 | 0.33 | 0.14 | 0.26 | 6.51 | 76.4 | 115.9 |
| 6 | Tin (24 cm$^2$) | 1.63 | 1.45 | 0.38 | 0.83 | 6.23 | 369.1 | 365.1 |
| 7 | Indium (5.6 cm$^2$) | 1.66 | 1.05 | 0.97 | 1.01 | 6.28 | 404.2 | 396.0 |
| 8 | Tin-lead alloy (6.1 cm$^2$) | 1.52 | 1.12 | 1.05 | 1.07 | 6.5 | 476.1 | 460.0 |

Fig. 14

| Case ID | Material | Potential | | | | Operational time ($t_{op}$), hours | Energy Delivered Joules | Charge delivered Coulombs |
|---|---|---|---|---|---|---|---|---|
| | | Open circuit | Maximum Reached during $t_{op}$ | Voltage at time equal to $t_{op}$ | Average during $t_{op}$ | | | |
| A | Trichloro-s-triazinetrione | 1.90 | 1.26 | 1.18 | 1.21 | 6.13 | 632.6 | 524.69 |
| B | Sodium dichloro-s-triazinetrione | 1.77 | 1.10 | 0.85 | 1.08 | 6.33 | 543.5 | 486.6 |
| C | 1-bromo-3-5,5-dimehylhydantoin | 1.65 | 1.13 | 0.99 | 1.05 | 6.33 | 506.7 | 476.3 |
| D | Mixture of Hydantoins | 1.65 | 1.63 | 0.57 | 0.80 | 6.5 | 302.5 | 370.2 |
| E | Chlorosucciminide | 1.80 | 1.20 | 1.10 | 1.09 | 6.34 | 547.7 | 490.3 |
| F | Bromosucciminide | 1.82 | 1.29 | 1.19 | 1.25 | 6.1 | 684.8 | 543.2 |
| G | Iodosucciminide | 1.43 | 0.65 | 0.36 | 0.38 | 6.36 | 66.4 | 171.7 |

Fig. 16

| Case ID | Aluminum anode | Purity (%) | Thickness / diameter | Vendor | Active anode bulk area |
|---|---|---|---|---|---|
| 2a | Aluminum foil | 99.8 | 0.1 mm | Alcoa | 24 |
| 2b | Aluminum sheet | 99.998 | 1.0 mm | Alfa aesar | 24 |
| 2c | H.P. Aluminum foil | 99.9999 | 0.25 mm | Alfa aesar | 24 |
| 2d | Aluminum wire | 99.998 | 1.0 mm | Alfa aesar | 12 |

Fig. 17

| Case ID | Used aluminum anode/Purity | Potential | | | | Operation time (top), hours | Energy Delivered Joules | Charge delivered Coulomb | Energy delivered per gram of Al* |
|---|---|---|---|---|---|---|---|---|---|
| | | Open circuit | Maximum Reached V, during top | Voltage at time equal to top | Average during top | | | | |
| 2a | Al foil / 99.8 | 1.86 | 1.22 | 1.11 | 1.08 | 6.19 | 550.0 | 476.5 | 8 KJ |
| 2b | Al foil / 99.998 | 1.90 | 1.26 | 1.18 | 1.21 | 6.13 | 632.6 | 524.7 | 8 KJ |
| 2c | H.P.Al foil / 99.9999 | 1.87 | 1.43 | 1.41 | 1.30 | 6.5 | 787.8 | 601.6 | 9 KJ |
| 2d | Al wires / 99.998 | 1.91 | 1.23 | 0.91 | 1.16 | 6.14 | 594.9 | 507.3 | 8 KJ |

*Aluminum was determined by weight difference of the material (as received) and after thoroughly rinsing it and drying it. The anodes were weighted using a 5 decimal balance.

Fig. 18

| Case ID | Metal anode (Active area) | Potential | | | | Operational time ($t_{op}$), hours | Energy Delivered Joules | Charge delivered Coulombs |
|---|---|---|---|---|---|---|---|---|
| | | Open circuit | Maximum Reached V, during $t_{op}$ | Voltage at time equal to $t_{op}$ | Average during $t_{op}$ | | | |
| 2d | Aluminum (12 cm$^2$) | 1.91 | 1.23 | 0.91 | 1.16 | 6.14 | 594.9 | 507.3 |
| 7 | Indium (5.6 cm$^2$) | 1.66 | 1.05 | 0.97 | 1.01 | 6.28 | 404.2 | 396.0 |
| 8 | Tin-lead alloy (6.1 cm$^2$) | 1.52 | 1.12 | 1.05 | 1.07 | 6.5 | 476.1 | 460.0 |

Fig. 19

| Case ID [Load Used] | Used aluminum anode/ Purity | Potential | | | | Operation time (top), hours | Energy Delivered Joules | Charge delivered Coulomb | Energy delivered per gram of Al* |
| --- | --- | --- | --- | --- | --- | --- | --- | --- | --- |
| | | Open circuit | Maximum Reached V, during top | Voltage at time equal to top | Average during top | | | | |
| 2e [500 ohms] | Al / 99.999 Rod used directly as shown in figure 2A | 1.82 | 1.52 | 0.63 | 1.01 | 543 | 4254 | 3952 | 6.4 KJ |
| 2d [500 ohms] | Al / 99.998 Used as shown n fig. 2B | 1.80 | 1.11 | 0.48 | 0.69 | 25 | 83 | 116 | 4.5 KJ |
| 2d [500 ohms] | Used with Palladium wire as cathode as shown in Fig. 2C | 1.81 | 1.30 | 0.89 | 1.11 | 13.6 | 122 | 109 | NA |

Figure 1. Comparison of cells using platinum, Pt, & PAC, as catalyst mixed w/oxidizer (each point represents 1-hour averages)

ELECTROCHEMICAL POWER SOURCE USING HALOGENATED ORGANIC COMPOUNDS

CROSS-REFERENCE TO RELATED APPLICATIONS

This application claims priority from U.S. Provisional Application No. 60/746,816 filed on May 9, 2006, entitled "System and Method for Supplying Oxy-Halogenated Ions for Electrochemical Power Sources".

STATEMENT OF GOVERNMENT INTEREST

This invention was made with Government support under Grant No. DASG60-00-C-0089 awarded by the U.S. Army Space and Missile Defense Command. The Government has certain rights in the invention.

BACKGROUND OF THE INVENTION

A battery is a device in which an electrochemical reaction, capable of producing energy, occurs spontaneously. Research in battery designs have been intensive technological endeavors for over five decades. Electronic devices, common in households, as well as observing and sensing systems with applications in various arenas motivate the development of powering systems with increased performance. Generally speaking, an electrochemical cell or galvanic cell couples two half-reactions to create a battery or power source. In one of these reactions a first compound reduces its oxidation state and in the other reaction a second compound oxidizes or losses electrons. The electron transfer can be harvested and used in electrical and electronics devices.

Various materials are known in the art for use as anodes for the fabrication of galvanic cells or batteries. When choosing a material to serve in a half reaction as part of a galvanic cell, the selected material should have an attractive oxidation potential. The oxidation potential is an indication of the achievable potential that the cell in which the selected material is used as an electrode is capable of providing, since the overall reaction potential is given by the sum of the potentials of the half reactions involved. Additionally, the sign of the oxidation potential and its magnitude provides insight on the spontaneity of the reaction. The table shown in FIG. 1 presents a list of standard oxidation potentials of several common anode materials in battery systems currently known in the art.

When fabricating practical battery cells, it is important to consider not only the standard oxidation potential but also the material's physicochemical characteristics. The molecular weight of the substance and its change in oxidation state will dictate the theoretical maximum specific energy that such a material can provide. The maximum specific energy is the energy per unit weight of the material. The theoretical energy density will be directly influenced by the material's density. The theoretical energy density is the energetic content per unit volume of the material.

Depending on the ultimate application, various parameters should be considered in the selection of a battery. Certain devices require batteries with a given potential output while drawing a specific current, while other devices require power outputs that are variable in nature and the batteries used for these devices should be able to provide a complex output profile.

The parameters that have been regarded as the most important to rate the performance of an electrochemical battery are the specific energy and/or the energetic density. The table in FIG. 2 illustrates several physicochemical properties of selected anode materials, including lithium, magnesium, aluminum and zinc, along with their theoretical energy content under standard conditions. The table in FIG. 2 also illustrates that lithium is the material with the highest energetic content per unit of mass. This explains why this chemical has been thoroughly investigated for battery development. Aluminum, due to its relatively low molecular weight for a charge transfer of three electron-mol per mol of substance and its low mass density has a higher energy density when compared to that of lithium. This is one of the reasons why aluminum has also been intensively investigated for the development of batteries. The table in FIG. 2 illustrates additional metals that present very attractive characteristics for electrochemical batteries, including magnesium and zinc, both of which have also been used in the past for developing battery systems.

In order to produce an electrochemical cell, a cathode half reaction is coupled to an anode reaction. The cathode reagent should be an oxidizer that is able to reduce the anode material. The table of FIG. 3 illustrates some common oxidizer reactions that have been used for electrochemical batteries that are currently known in the art.

Recent progress in the development of electrochemical batteries encompasses the use of novel materials that can serve as cathodes or anodes. Other types of galvanic cells have also been thoroughly investigated. In some cases the reagents are freshly introduced in the galvanic chamber containing the cathode and the anode for continuous power output. When reagents are utilized to replenish the function of either one of the electrodes, the cell is generally termed as a semi-fuel cell. When reagents are involved in both cathode and anode reactions a fuel cell is constructed. The oxygen reduction in the table of FIG. 3 is a half reaction commonly known in semi-fuel and fuel cells. Rechargeable batteries are another alternative that has been investigated in the art. The last two reactions in the table of FIG. 3 are examples of half reactions used in cells of rechargeable batteries. In general, regardless of the type of battery several issues should be considered, including safety, prevention of alternate reactions of the reagents and cost effectiveness. Regarding safety, it is important that the stored reagents and the products generated during the electrochemical reaction are safe and preferably amiable to constructing environmentally friendly devices. Additionally, it is important that the reagents do not follow alternate reactions, and if they do follow alternate reactions, that they are beneficial for the overall power system. An example of a beneficial alternate reaction can be found in the Lecanchle's cells that are known in the art. In the Lecanchle's cells, the hydrogen that is released in the cathode reaction, which is the first reaction illustrated in the table of FIG. 3, reacts with $MnO_2$ and no interference is found in the cathode process. Also, it is important that the reagents and electrodes utilized in the electrochemical cell allow for the fabrication of a cost effective cell.

Many electrochemical battery systems are known in the art. A list of the reported galvanic cells that have appeared in literature can be found in the *Handbook of Batteries, 3rd Edition*, by D. Linden and T. B. Reddy, which is incorporated herein by reference. The table illustrated in FIG. 4 has been compiled from the *Handbook of Batteries* reference. The table shown in FIG. 4 illustrates selected battery systems as an illustration of available commercial systems based on active anode and cathode materials, including $O_2$, but not air (electrolyte not included). The values listed are for single cell batteries based on the identified design and at discharge rates optimized for energy density using midpoint voltage.

The table shown in FIG. 4 includes primary batteries, those cells that are designed to be on the shelf and produce energy when in use and be disposed of after their useful life, in addition to secondary batteries, rechargeable batteries and fuel cells. An additional type of electrochemical cell known in the art is a reserve battery. A reserve battery requires activation operations that will close the circuit and start the production of energy "on-demand". The activation operation could encompass events such as the introduction of electrolyte or the melting of substances to induce the conduction of ions responsible for the charge transfer between the anode and the cathode.

It is known in the art that aluminum, as well as magnesium and zinc, have been coupled with a very high number of available oxidizers, including oxygen from the air to form electrochemical cells. The table of FIG. 5 illustrates some of the solutions that are currently known in the art utilizing aluminum anodes. In spite of recent advances in these arenas, batteries utilizing these metals have not been successful in wide-spread commercial products primarily due to anode inefficiencies as well as unexpected polarization of the anodes.

Accordingly, what is needed in the art is an improved electrochemical battery that is safe, efficient and economical.

SUMMARY OF INVENTION

In accordance with the present invention materials capable of releasing ions to supply the necessary chemicals that directly participate in cathode reactions can be coupled to anode reactions and produce electrical energy. In a particular embodiment, batteries with different configurations that have many attractive features are provided. The electrochemical cells in accordance with the present invention can be used as reserve cells and can be activated by simply adding water or aqueous solutions of conductive salts. The cells have a high energy density and are ideal to power systems that require long shelf life and are reliable when used.

In accordance with the present invention, an electrochemical power source is provided including a cathode and a metallic anode positioned to define an interstitial space between the catalytic cathode and the metallic anode and a non-aqueous oxyhalogenated ion releaser positioned at least partially within the interstitial space between the catalytic cathode and the metallic anode.

Various materials are within the scope of the present invention for use as the cathode, including, but not limited to platinum, palladium, nickel, graphitic carbon, iridium, ruthenium, osmium, rodium, gold, silver, copper and alloys or composites of these metals. In the present invention, the cathode is a current collector that is a conductive surface capable of charge transfer with the reduced species resulting from the reaction of the oxyhalogenated ion releaser.

Various materials are within the scope of the present invention for use as the metallic anode, including, but not limited to aluminum, lithium, magnesium, zinc, iron, indium, tin and tin-lead alloy.

Various materials are within the scope of the present invention for use as the oxyhalogenated ion releaser, including, but not limited to trichloro-isocianuric acid, sodium dichloro-s-triazinetrione, 1-bromo-3-chloro-5,5-dimethylhydantoin, 1,3-dichloro-5-methyl, 5-ethyl hydantoin, chlorosucciminide, bromosucciminide and iodo succiminide. In a particular embodiment, the oxyhalogenated ion releaser is a halogenated solid heterocyclic compound.

In a particular embodiment, the cathode, the metallic anode and the oxyhalogenated ion releaser are layered to form a substantially flat cell. In a specific embodiment of the flat cell, the cathode is formed by a thin layer of platinum sputtered on a silicon wafer and the metallic anode is either a metallic plate or a metallic wire. In this embodiment, the cathode is separated from the anode by a polysulfone layer.

In an additional embodiment, the metallic anode and the oxyhalogenated ion releaser are concentrically positioned within a cylindrical container to form a cylindrical cell. In a specific embodiment, the cathode is a substantially thin carbon cloth sputtered with platinum and the anode is either an aluminum or platinum rod or a Mylar rod having an aluminum or platinum wire coiled around it.

In an accordance with the present invention, a method of providing electrochemical power is provided including the steps of positioning a cathode and a metallic anode to form an interstitial space therebetween, positioning a non-aqueous oxyhalogenated ion releaser within the interstitial space, introducing an aqueous solution into the interstitial space to enable the production of oxyhalogenated acid and the subsequent release of hypochlorite ions from the oxyhalogenated ion and providing electrochemical power resulting from the reaction between the hypochlorite ions, the cathode and the metallic anode. The aqueous solution may be water or an aqueous solution of conductive salts.

Halogenated organic compounds that are inexpensive and are readily available have been used to present the examples of the invention. These chemicals, when in contact with water experience a reaction that releases oxy-halogenated acid. These compounds are weak acids and release hydrogen ions according to their ionization constants, keeping a constant level of oxy-halogenated ion. These ions are capable of reacting with catalytic cathodes and can be coupled with anode materials to fabricate galvanic cells. Exemplary embodiments of the present invention include cells with flat and cylindrical form factors having a variety of anodes.

BRIEF DESCRIPTION OF THE DRAWINGS

For a fuller understanding of the invention, reference should be made to the following detailed description, taken in connection with the accompanying drawings, in which:

FIG. 1 is a table illustrating the oxidation reactions and standard potential for common anode materials known in the art.

FIG. 2 is a table illustrating the physiochemical properties of various common anode materials known in the art.

FIG. 3 is a table illustrating some common cathode half reactions that have lead to patented and commercial cells known in the art.

FIG. 4 is a table of selected battery systems as an illustration of available commercial systems known in the art.

FIG. 5 is a table illustrating several aluminum anode systems that are known in the art.

FIG. 6 is a table illustrating various chemicals capable of producing hypochlorous acid in accordance with embodiments of the present invention.

FIG. 9 is an illustration of a cylindrical assembly of cells, both bobbin type and button size, in accordance with the present invention.

FIG. 10 is a table illustrating anode materials that have been tested with the new set of cathode materials proposed by the present invention.

FIG. 11 is a table illustrating the commercially available materials capable of releasing oxy-halogenated acids.

FIG. 13 is a table illustrating the performance characteristics with flat cells built using foils or sheet metals in accordance with the present invention.

FIG. 14 is a table illustrating the performance characteristics of cells built in accordance with the present invention.

FIG. 16 is a table illustrating the various aluminum anodes utilized for testing the novel chemistry in accordance with the present invention.

FIG. 17 is a table illustrating a summary of the obtained results after testing the novel cells again with a 50 ohm load.

FIG. 18 is a table illustrating the performance characteristics with flat cells built using anodes acquired as wires in accordance with the present invention.

FIG. 19 is a table illustrating the results obtained in the cylindrical cell configurations of the present invention tested at constant loads.

DETAILED DESCRIPTION OF THE PREFERRED EMBODIMENT

Figure 7:
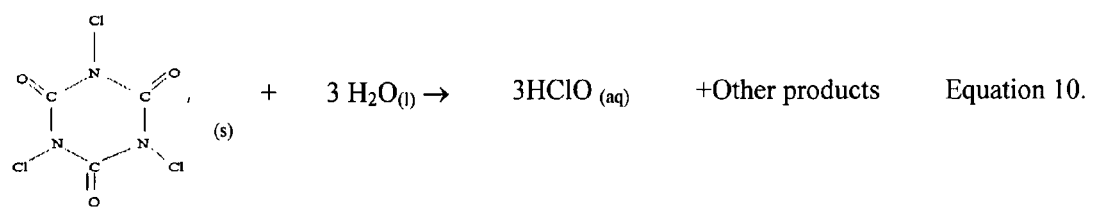
FIG. 7 is an equation illustrating the reaction that takes place, using trichloro-isocianuric acid, when water is added, in accordance with a particular embodiment of the present invention.

The present invention provides for an electrochemical power source using halogenated organic compounds. In particular the present invention focuses on optimizing aluminum-anode systems for use as reserve battery systems. The reserve battery utilizing the solid dissolutions in accordance with the present invention enables improved control in the release of hydroxide ions, which in turn provides for better control of parasitic reactions in the reserve battery.

In a particular embodiment of the present invention using sodium peroxide, the mechanistic reactions that occur are shown in Equation 1 and Equation 2.

$$Na_2O_{2(s)} + H_2O_{(l)} \rightarrow O_2H_{(aq)}^{-1} + 2Na_{(aq)}^{+1} OH_{(aq)}^{-1} \quad \text{Equation 1}$$

$$O_2H_{(aq)}^{-1} + H_2O_{(l)} + 2e \rightarrow 3OH_{(aq)}^{-1} \quad \text{Equation 2}$$

which leads to the overall cathode reaction;

$$Na_2O_{2(s)} + 2H_2O_{(l)} + 2e \rightarrow 2Na_{(aq)}^{+1} + 4OH_{(aq)}^{-1} \quad E°=+0.87V \quad \text{Equation 3}$$

The overall chemical reaction, when the reaction represented by Equation 3 is coupled with aluminum is then;

$$2Al_{(s)} + 3Na_2O_{2(s)} + 6H_2O \rightarrow 2NaAl(OH)_{4(aq)} + 4NaOH_{(aq)} \quad E°=3.2V \quad \text{Equation 4}$$

Equation 3 can be compared to the electrochemical cathode reaction of hydrogen peroxide, show below:

$$H_2O_{2(aq)} + OH_{(aq)}^{-1} + 2e \rightarrow 3OH_{(aq)}^{-1} \quad E°=+0.89V \quad \text{Equation 5}$$

The comparison of the electrochemical reactions represented in Equation 3 and Equation 5 evidences two additional differences are observed:

(1) Water is the only necessary reagent to start the reaction of Equation 3, while hydrogen peroxide requires the initial presence of hydroxide ion as shown in Equation 5.

(2) Excess hydroxide ions are produced in accordance with Equation 3 such that the aluminum hydroxide does not form as a scale. Soluble sodium aluminate is formed.

When designing the cathode reactions via the alkali peroxide in accordance with the present invention, the properties of aluminum compounds were taken into account. Specifically the formation of soluble/insoluble species in the presence of certain pHs was utilized to improve the electrochemical energy production.

Based on the alkali metal peroxide battery system in accordance with the present invention, a solid material is used that will maintain optimal conditions so that the energy-producing reactions are kept. Aluminum systems were examined in accordance with particular embodiments of the present invention, as shown with reference to the table of FIG. 6. In accordance with these embodiments, solid chemical systems are sought that are capable of releasing hypochlorite ions. Chemical compounds are known in the art that can release hypochlorous acid. Hypochlorous acid is a weak acid and it is able to produce hypochlorite ions. Equation 6a-6c results from the ionization equilibrium of the water and that of hypochlorite ion:

$$HClO_{(aq)} \leftrightarrow ClO^-_{(aq)} + H^+_{(aq)} \quad Ka=2.9\times10^{-8} \quad \text{Equation 6a}$$

$$HBrO_{(aq)} \leftrightarrow BrO^-_{(aq)} + H^+_{(aq)} \quad Ka=2.5\times10^{-9} \quad \text{Equation 6b}$$

$$HIO_{(aq)} \leftrightarrow IO^-_{(aq)} + H^+_{(aq)} \quad Ka=2.3\times10^{-11} \quad \text{Equation 6c}$$

The chemical reactions shown in Equation 6a-6c indicates that hydroxide ions can be maintained at an optimal level if a chemical is found that can produce hypochlorous acid. As such, in accordance with an embodiment of the present invention, solid chemicals that are able to produce hypochlorous acid (and hence hypochlorite ions) are used to provide high energy content batteries. Some of the chemicals identified, capable of releasing hypochlorous acid (hypochlorite ions) that are readily available are halogenated nitrogen heterocyclic compounds. Some of these materials are listed in the table of FIG. 6.

All of the chemicals compiled in the table of FIG. 6 are commonly used for pool treatment as they provide both hypochlorous acid (very strong oxidizer) that is used as a disinfectant. Hypochlorous acid and hypobromus acids are also strong oxidizers that have a high potential as shown in Equation 8a and 8b:

$$2HClO_{(aq)} + 2H^+_{(aq)} + 2\bar{e} \rightarrow Cl_{2(g)} + 2H_2O \quad E°=1.64\,V \quad \text{Equation 8a}$$

$$2HBrO_{(aq)} + 2H^+_{(aq)} + 2\bar{e} \rightarrow Br_{2(g)} + 2H_2O \quad E°=0.76\,V \quad \text{Equation 8b}$$

In a particular embodiment of the present invention, utilizes trichloro-isocianuric acid, when water is added, the chemical reaction occurs as shown with reference to FIG. 7. Similar reactions to the reaction illustrated in FIG. 7 can also be written for the other chemicals presented in the table of FIG. 6.

In accordance with an exemplary embodiment of the present invention, cathode collectors were used. In these exemplary embodiments, platinum and palladium were two of the catalytic materials used; however other materials are within the scope of the present invention. In the present invention, the cathode is a current collector that is a conductive surface capable of charge transfer with the reduced species resulting from the reaction of the oxyhalogenated ion releaser. Both flat cells and cylindrical cells were tested.

Figure 8:
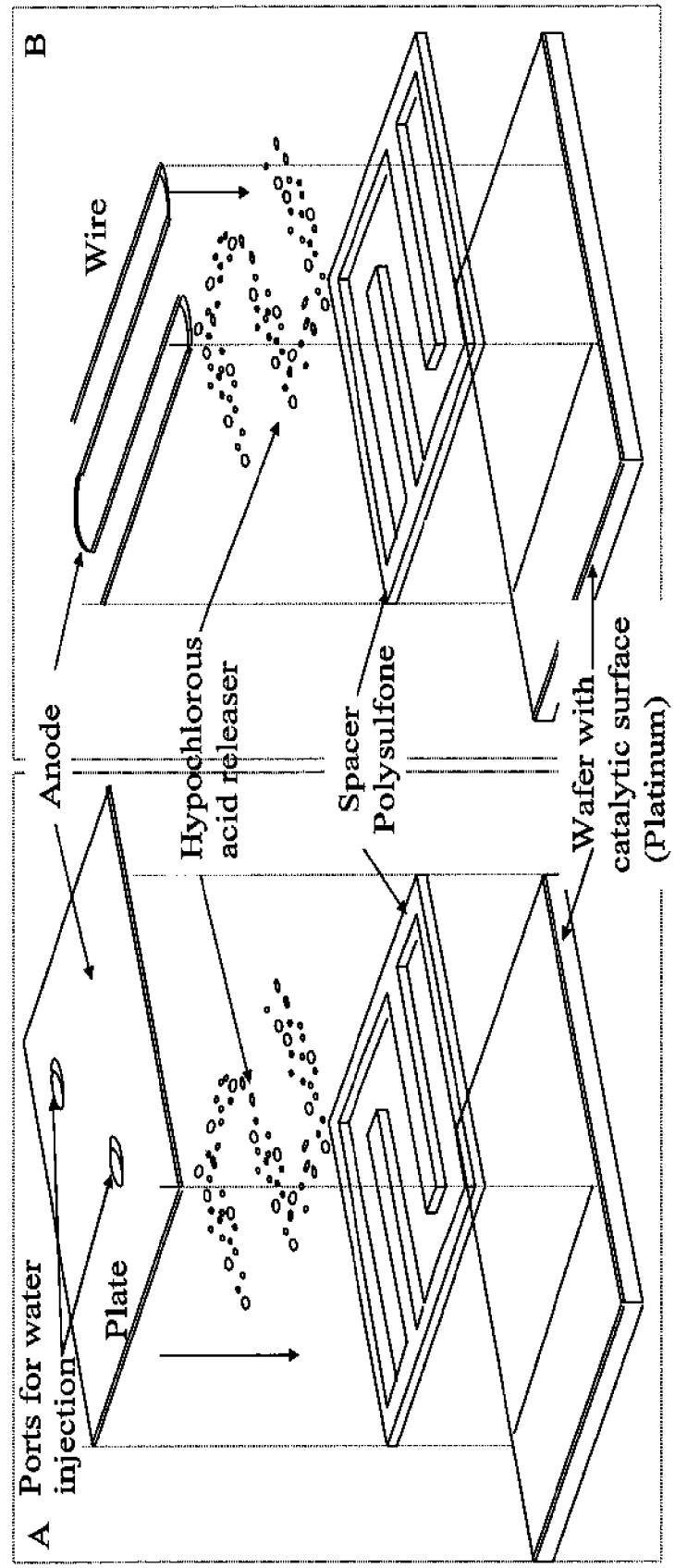
FIG. 8A is an illustration of a flat form factor battery fabricated having a plate anode material in accordance with an embodiment of the present invention.
FIG. 8B is an illustration of a flat form factor battery having a wire functioning as the anode in accordance an embodiment of the present invention.

With reference to FIG. 8, the flat fabricated cells were constructed layering three basic components as illustrated. In FIG. 8A, a flat battery cell 5 having a catalytic material that is a thin layer of platinum 15 sputtered on a 100 cm diameter 500 micron-thick silicon wafer 10. The second layer of material is a thin polysulfone layer (800 μm) 20 that was cut to serve as a separator and a structural supporter of the anode material 25. In this embodiment, the anode material is an aluminum plate 25. In an additional embodiment as shown in FIG. 8B, an aluminum wire 30 is used as the anode material to form the flat cell 45. The layers were glued after a predetermined amount of the hypochlorous acid releaser 40 was placed on the space formed within the polysulfone spaces 20.

In an additional exemplary embodiment of the present invention, the cylindrical cell types were constructed as shown with reference to FIG. 9. In these exemplary embodiments, the cell construction consisted of assembling concentric electrodes on a plastic cylindrical container 70. With reference to FIG. 9A, a battery cell 50 is assembled wherein the cathode electrode 55 is a thin carbon cloth onto which platinum was sputtered. The cloth was rolled and placed on the cylindrical container 70. The anode was then placed and filled with the hypochlorous acid releaser 75. In FIG. 9A, a solid rod of aluminum 60 was utilized as the anode. In the battery cell 55 of FIG. 9B the anode consists of an aluminum coil 85 rolled onto a cylindrical mylar piece 80. The cell assembly 55 of FIG. 9B is considerably lighter than the cell assembly 50 of FIG. 9A.

The cell illustrated in FIG. 9C 90 resembles a coin cell rather than a "D"-type cell, as was the case for the cells shown in FIG. 9A and FIG. 9B. The cell of FIG. 9C 90 also differs from cell types A and B in that a palladium wire forming a coil 100 is used as the cathode. Aluminum wire forming a circular loop 95 is utilized as the anode and the cell assembly is similar to that illustrated with reference to FIG. 9A and FIG. 9B in which the anode 95 and cathode 100 electrodes are placed on the plastic container 70 and then the hypochlorous releaser 75 is added.

The table shown in FIG. 10 shows several of the anode materials that are within the scope of the present invention to be used to fabricate cells as described above. The table shows some of the materials that were identified to react with water to produce hypochlorite ions through the chemical production of hypochlorous acid. The table shown in FIG. 11 lists some commercially available materials utilized herein to release the hypochlorite ion in fabricated cells in accordance with particular embodiments of the present invention.

Figure 12:
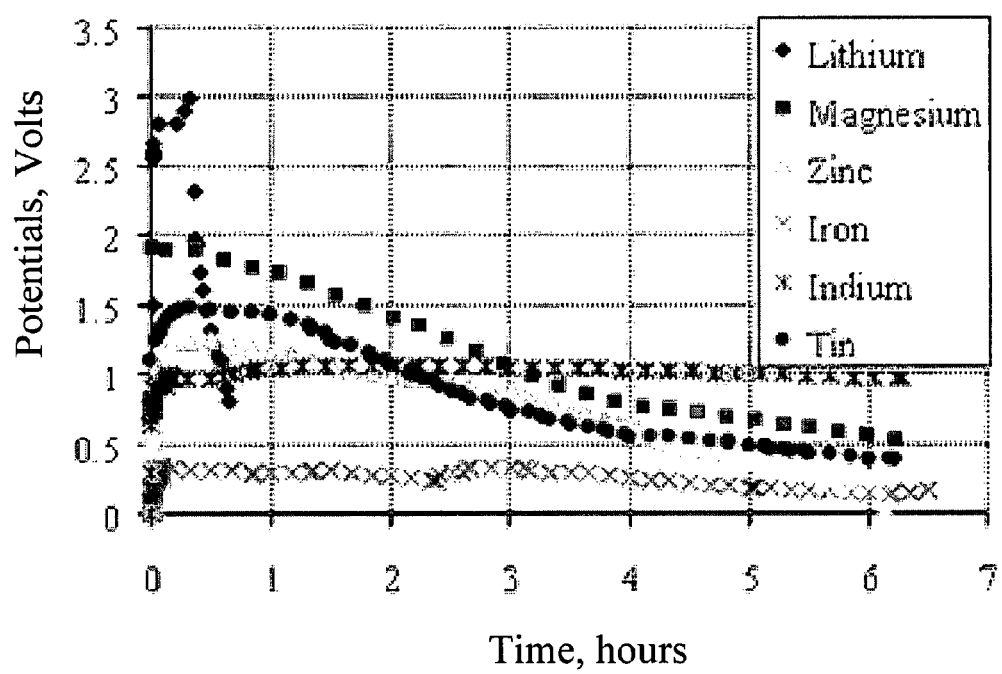
FIG. 12 is a chart illustrating the potential vs. time for flat cells constructed with different anodes in accordance with the present invention.

To illustrate the present invention in which the halogenated solid heterocyclic compounds are shown to produce sufficient amounts hypochlorous acid and hypochlorite ions to sustain a sizable potential, several potential compounds were coupled with one of the following materials: metallic lithium, magnesium, aluminum, zinc, iron, indium, tin and a tin-lead alloy. In an exemplary embodiment, thrichloro-s-triazinetrione was coupled with various metal anodes in flat battery cells to test the results of these exemplary embodiments. The thrichloro-s-triazinetrione material that was used is a commercially available material with the highest content of halogen (99.0% Chlorine). The graph in FIG. 12 illustrates the potential obtained as a function of time from these exemplary cells while subjected to a 50-ohm load nominal load utilizing the anode materials shown.

The table in FIG. 13 illustrates the performance characteristics with flat cells built using foils or sheet metals as described. In most cases the operational time was around 0.4±0.3 hours. Tri-chloro-s-triazinetrione power was used as the hypochlorous acid releasing material and tap water was used to activate the cells. Constant load testing using a nominal 50 ohm-load was used. The table in FIG. 13 shows that the aluminum sheet provides a very stable potential output (where 1.26 is the maximum potential and the potential at $t=t_{op}$, is equal to 1.21 Volts. It is likely that the acidic state on the electrolyte favors the formation of Aluminum tetrahydroxide ions and possible chlorides (both of which are soluble). Aluminum was used to continue with further testing of the other halogenated heterocyclic compounds materials.

Sheet aluminum with a purity of 99.998% was used to test the other chemicals capable of releasing oxy-halogenated compounds. The hypochlorous acid releaser materials, when available as a solid tablet, were pulverized using a mortar. Cells as that shown in FIG. 9A were then assembled and tested also with a constant load.

The table illustrated in FIG. 14 shows a compilation of the results obtained after running the cells for about 6 hours. Again integration of the delivered current and work was numerically performed. In the table of FIG. 14, characteristics of cells built as described in text are illustrated. In most cases the operational time was around 6.4+−0.3 hours. Aluminum is used as the anode. Tap water is used to activate the cells unless as indicated. Constant load testing using a nominal 50 ohms-load.

Figure 15:
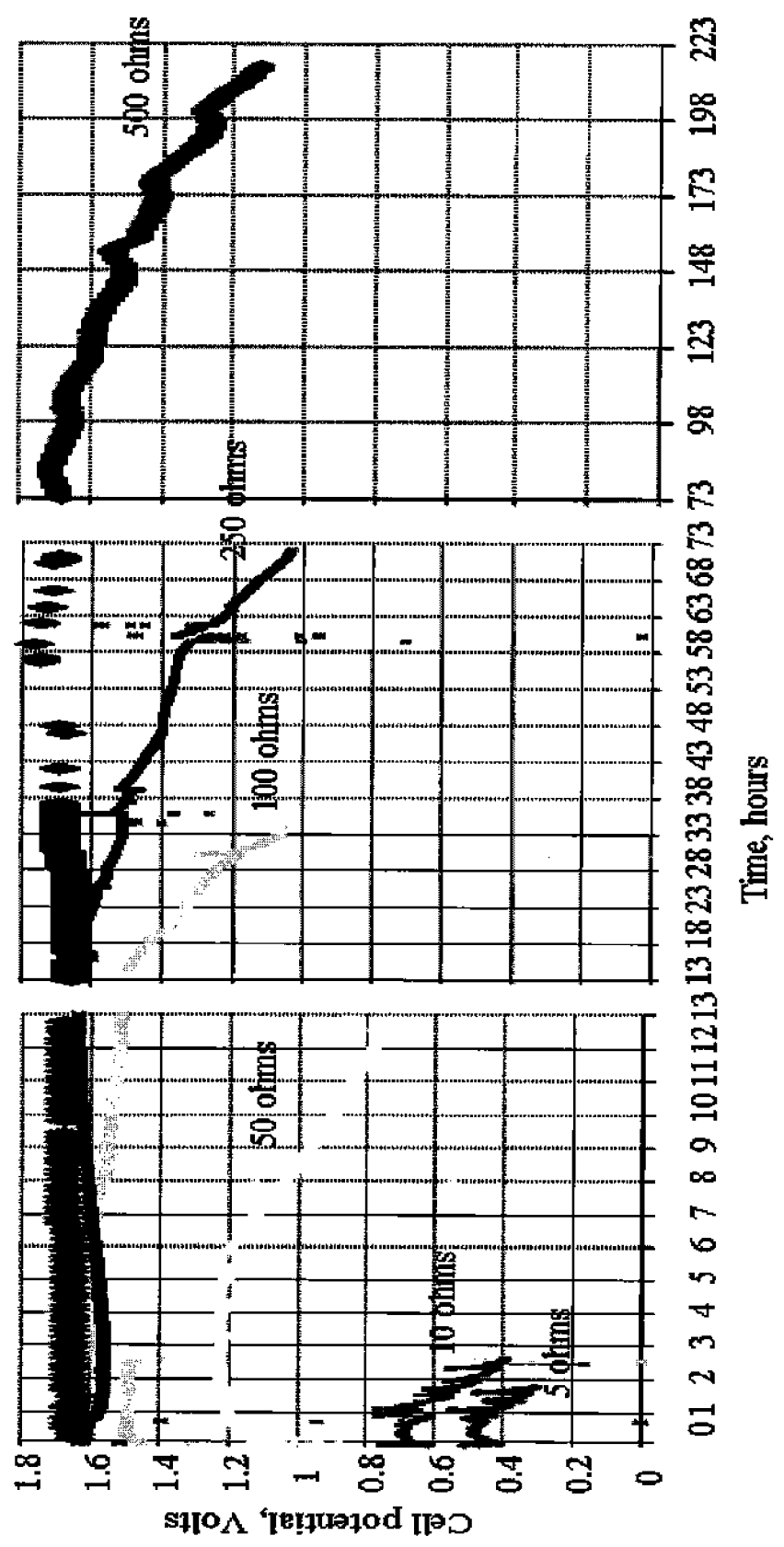
FIG. 15 is a chart illustrating the cell potential vs. time for various cells in accordance with the present invention.

The graphs in FIG. 15 illustrate the performance under various loads for a flat cell constructed as stated in FIG. 9A using aluminum (99.998% purity as an anode) and trichloro-s-azinetnone.

In order to assess the required purity of the aluminum to build cells with sizable potentials and significant energy densities, cells as illustrated in FIG. 9 were fabricated with aluminum anodes of various purities. The table illustrated in FIG. 16 shows some of the characteristics of these materials.

The table in FIG. 17 shows a summary of the obtained results after testing the cells again with a 50 ohm-load.

The results in the table of FIG. 17 show that there is a relation between the aluminum purity and the energy and charge delivered by the cell. The energy and charge are increase when the purity of the aluminum is higher. However the numbers also show that the exceeding amount of energy of the highest purity aluminum of may not be worth the considerably higher price of this material when compared to the other aluminum alloys.

Since it has been reported that high energetic efficiencies in anode utilization can be achieved by varying the anode to cathode ratio, several experiments were performed in which a 24 $cm^2$ cathode surface (sputtered platinum on a silicon water) was coupled with anode-materials of various areas. The results have been compiled and are shown in the table of FIG. 18.

The cells with cylindrical configurations hosted a different amount of hypochlorous acid releaser than that contained in the flat cells. For this reason, the runs were not limited to just 6 hours. The results utilizing cells having a cylindrical configuration are illustrated in the table of FIG. 19.

Figure 20:
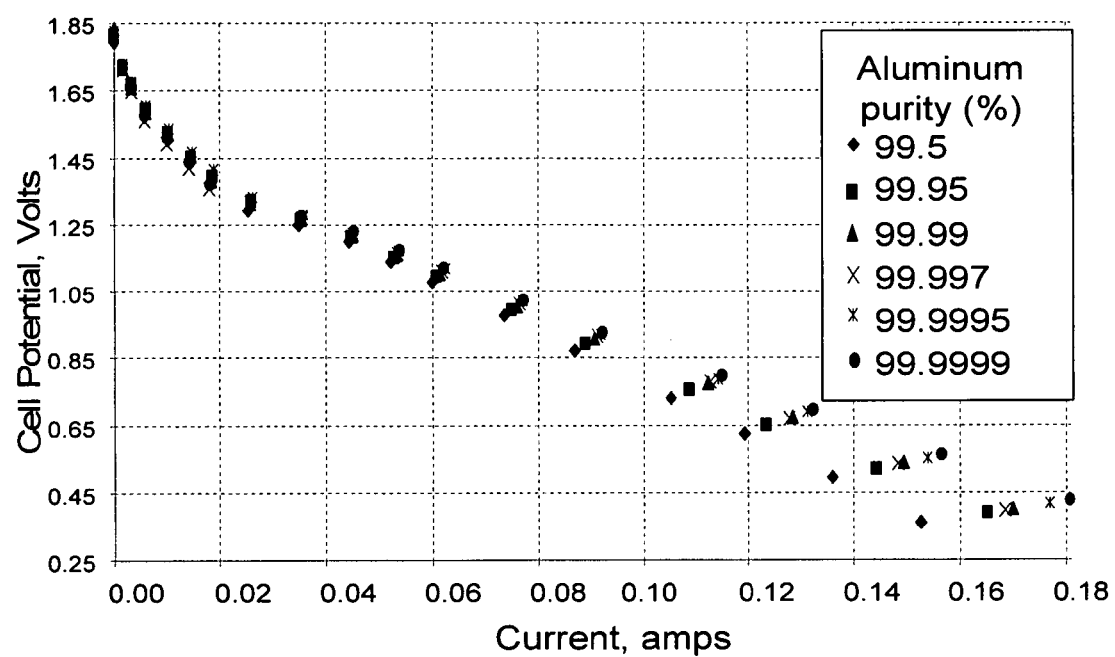
FIG. 20 is a graph illustrating the voltage vs. current drawn from a fabricated cell with aluminum anode plates, trichloroisocyanuric acid and a wafer onto which platinum has been sputtered in accordance with an embodiment of the present invention.
Figure 21:
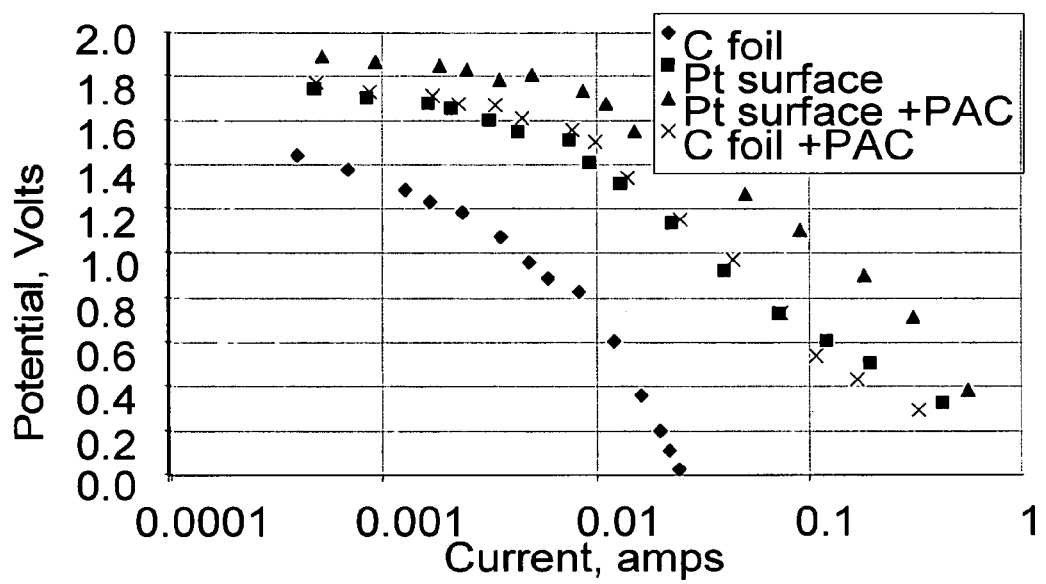
FIG. 21 is a graphical illustration of the comparison of cells using platinum, Pt, and PAC as catalyst mixed w/oxidizer (each point represents 1-hour averages).

In an additional embodiment, lower cost cells may be produced in accordance with the present invention by utilizing less expensive materials for the cathode of the cell. In an exemplary embodiment, a cell is fabricated with aluminum anodes plates, trichloroisocyanuric acid and a wafer onto which platinum has been sputtered. The results for this cell are illustrated in the graph of FIG. 20. A graph comparing cells in accordance with the present invention using various combinations of platinum, PAC and C foil are illustrated with reference to FIG. 21.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. An electrochemical power source comprising:
   a cathode and a metallic anode positioned to define an interstitial space between the cathode and the metallic anode; and
   a solid oxyhalogenated ion precursor positioned at least partially within the interstitial space between the cathode and the metallic anode, wherein the oxyhalogenated ion precursor is selected from the group comprising trichloro-isocianuric acid, sodium dichloro-s-triazinetrione, 1-bromo-3-chloro-5,5-dimethylhydantoin, 1,3-dichloro-5-methyl, 5-ethyl hydantoin, chlorosucciminide, bromosucciminide and iodo succiminide.

2. The electrochemical power source of claim 1, wherein the cathode is selected from the group consisting of platinum, palladium, nickel, graphitic carbon, iridium, ruthenium, osmium, rodium, gold, silver, copper and alloys or composites of these metals.

3. The electrochemical power source of claim 1, wherein the metallic anode is selected from the group consisting of aluminum, lithium, magnesium, zinc, iron, indium, tin and tin-lead alloy.

4. The electrochemical power source of claim 1, wherein the solid oxyhalogenated ion precursor is powdered.

5. The electrochemical power source of claim 1, wherein the cathode, the metallic anode and oxyhalogenated ion precursor are layered to form a substantially flat cell.

6. The electrochemical power source of claim 5, wherein the cathode is a thin layer of platinum sputtered on a silicon wafer.

7. The electrochemical power source of claim 6, wherein the thin layer of platinum further comprises at least one fluid inlet opening.

8. The electrochemical power source of claim 5, further comprising a separator layer.

9. The electrochemical power source of claim 8, wherein the separator layer is a thin polysulfone layer positioned between the cathode and the metallic anode and the oxyhalogenated ion precursor is positioned within the interstitial spaces of the polysulfone layer.

10. The electrochemical power source of claim 5, wherein the metallic anode is a substantially flat metallic plate.

11. The electrochemical power source of claim 5, wherein the metallic anode is a plurality of metallic wires.

12. The electrochemical power source of claim 1, wherein the cathode, the metallic anode, and the oxyhalogenated ion precursor are concentrically positioned within a cylindrical container to form a cylindrical cell.

13. The electrochemical power source of claim 12, wherein the cathode is a substantially thin carbon cloth sputtered with platinum.

14. The electrochemical power source of claim 12, wherein the metallic anode is selected from the group consisting of an aluminum rod, an aluminum coil rolled around a cylindrical form, aluminum wire forming a circular loop.

15. The electrochemical power source of claim 12, wherein the cathode is a palladium wire in the shape of a coil.

16. A method of providing electrochemical power, the method comprising the steps of:
   positioning a cathode and a metallic anode to form an interstitial space therebetween;
   positioning a solid oxyhalogenated ion precursor within the interstitial space, wherein the oxyhalogenated ion precursor is selected from the group comprising trichloro-isocianuric acid, sodium dichloro-s-triazinetrione, 1-bromo-3-chloro-5,5-dimethylhydantoin, 1,3-dichloro-5-methyl, 5-ethyl hydantoin, chlorosucciminide, bromosucciminide and iodo succiminide;
   introducing an aqueous solution into the interstitial space to enable the production of oxyhalogenated acid from the solid oxyhalogenated ion precursor and the subsequent release of hypochlorite ions from the oxyhalogenated acid; and
   providing electrochemical power resulting from the reaction between the hypochlorite ions, the cathode and the metallic anode.

17. The method of claim 16, wherein the aqueous solution is selected from the group comprising water and an aqueous solution of conductive salts.

* * * * *